(12) United States Patent
Weaver et al.

(10) Patent No.: US 12,203,372 B2
(45) Date of Patent: Jan. 21, 2025

(54) VISUAL INDICATOR FOR CORRECT TORSION OF A ROCK BOLT

(71) Applicants: SANDVIK MINING AND CONSTRUCTION TOOLS AB, Sandviken (SE); SANDVIK MINING AND CONSTRUCTION AUSTRALIA PTY LTD, Milton (AU)

(72) Inventors: Steven Weaver, Heatherbrae (AU); Mieczyslaw Rataj, Heatherbrae (AU); Osvaldo Vallati, Heatherbrae (AU)

(73) Assignees: Sandvik Mining and Construction Tools AB, Sandviken (SE); Sandvik Mining and Construction Australia Pty Ltd, Milton (AU)

(*) Notice: Subject to any disclaimer, the term of this patent is extended or adjusted under 35 U.S.C. 154(b) by 210 days.

(21) Appl. No.: 17/774,830

(22) PCT Filed: Oct. 26, 2020

(86) PCT No.: PCT/EP2020/080013
§ 371 (c)(1),
(2) Date: May 5, 2022

(87) PCT Pub. No.: WO2021/089353
PCT Pub. Date: May 14, 2021

(65) Prior Publication Data
US 2022/0389816 A1 Dec. 8, 2022

(30) Foreign Application Priority Data
Nov. 8, 2019 (EP) .................................. 19208059

(51) Int. Cl.
*E21D 21/02* (2006.01)
*F16B 25/00* (2006.01)
(Continued)

(52) U.S. Cl.
CPC .......... *E21D 21/02* (2013.01); *F16B 25/0026* (2013.01); *F16B 31/02* (2013.01); *F16B 37/048* (2013.01)

(58) Field of Classification Search
CPC ................................. E21D 21/02; F16B 31/02
See application file for complete search history.

(56) References Cited

U.S. PATENT DOCUMENTS

| 3,161,174 A | 12/1964 | Harrison |
| 3,728,933 A * | 4/1973 | Grube ..................... F16B 31/02 29/446 |

(Continued)

FOREIGN PATENT DOCUMENTS

| AU | 2010223134 B2 | 9/2010 | |
| AU | 2020380573 A1 * | 4/2022 | ............. E21D 21/02 |

(Continued)

*Primary Examiner* — Frederick L Lagman
(74) *Attorney, Agent, or Firm* — Corinne R. Gorski

(57) ABSTRACT

A rotation indication device for a rock bolt including a central rod with a threaded trailing portion. The rotation indication device includes a blind nut having a threaded central recess for engaging the threaded trailing portion and a visual indication means provided at a bottom portion of the central recess and configured such that upon movement of the threaded trailing portion of the central rod into the bottom portion of the central recess, the central rod forces at least a portion of the visual indication means to move through a passage in the blind nut between the bottom portion of the central recess and the outside of the blind nut.

20 Claims, 3 Drawing Sheets

(51) Int. Cl.
*F16B 31/02* (2006.01)
*F16B 37/04* (2006.01)

(56) References Cited

U.S. PATENT DOCUMENTS

| | | | |
|---|---|---|---|
| 3,789,726 A * | 2/1974 | Gill | F16B 31/02 |
| | | | 411/8 |
| 4,000,681 A | 1/1977 | Coldren | |
| 4,295,761 A | 10/1981 | Hansen | |
| 4,322,193 A * | 3/1982 | Stahl | F16B 31/028 |
| | | | 29/505 |
| 4,347,020 A | 8/1982 | White et al. | |
| 4,556,350 A | 12/1985 | Bernhardt et al. | |
| 5,443,332 A | 8/1995 | Hollis | |
| 7,896,579 B2 | 3/2011 | Craig | |
| 2019/0277715 A1* | 9/2019 | Robertson | G01L 5/24 |

FOREIGN PATENT DOCUMENTS

| | | | | |
|---|---|---|---|---|
| CZ | 25706 U1 | 7/2013 | | |
| EP | 3910163 A4 * | 11/2021 | | E21D 21/02 |
| GB | 1370792 A * | 10/1974 | | F16B 31/02 |
| WO | 2007053893 A1 | 5/2007 | | |
| WO | 2017214639 A1 | 12/2017 | | |
| WO | 2018032106 A1 | 2/2018 | | |

* cited by examiner

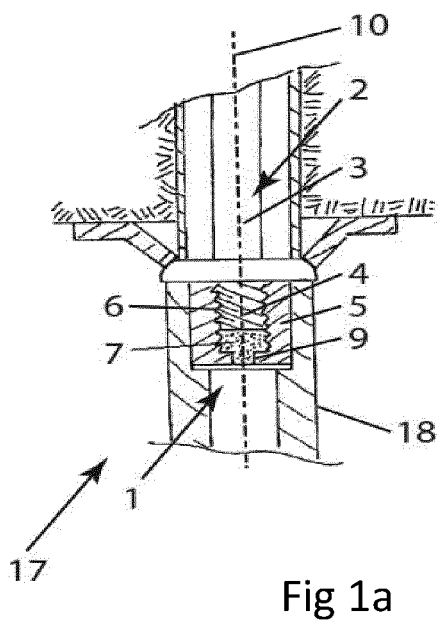
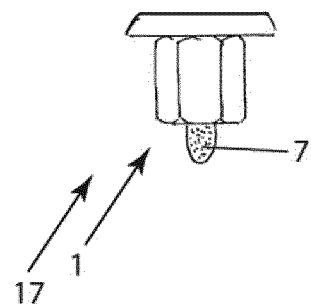
Fig 1a                    Fig 1b
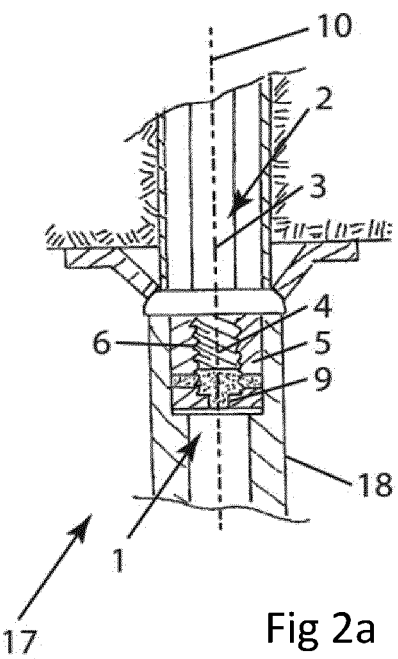
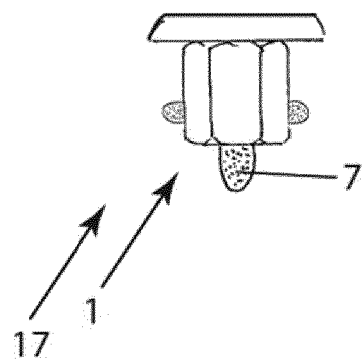
Fig 2a                    Fig 2b

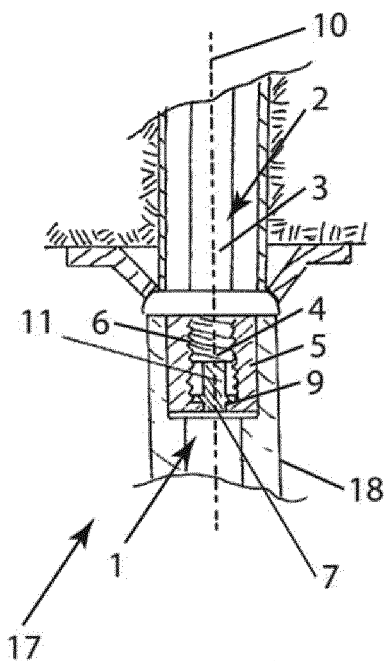
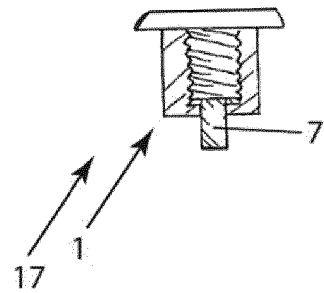
Fig 3a　　　　　　　　　　Fig 3b
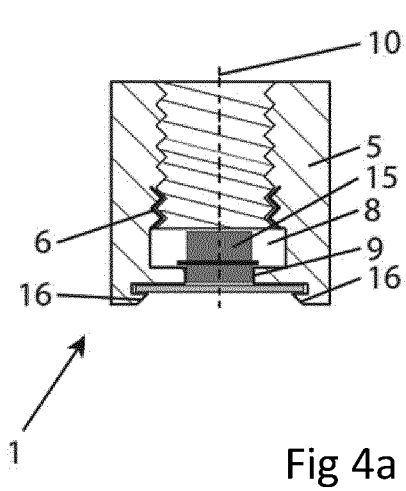
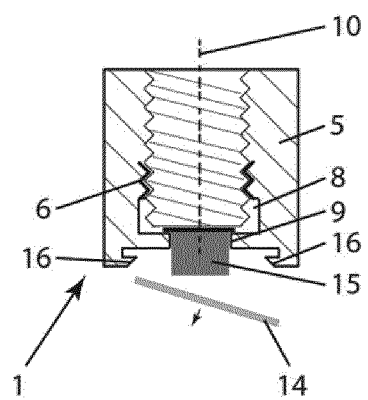
Fig 4a　　　　　　　　　　Fig 4b

VISUAL INDICATOR FOR CORRECT TORSION OF A ROCK BOLT

RELATED APPLICATION DATA

This application is a § 371 National Stage Application of PCT International Application No. PCT/EP2020/080013 filed Oct. 26, 2020 claiming priority to EP 19208059.6 filed Nov. 8, 2019.

TECHNICAL FIELD

The present disclosure relates to bolts for reinforcement of formations, such as rock strata, and specifically to technology for promoting correct installation of such bolts.

BACKGROUND

Formations, such as rock formations or rock strata, are often reinforced using rock bolts. For example, rock bolts are commonly used for reinforcement of tunnel roofs and for stabilization of rock walls, slopes and dikes. Various types of rock bolts or anchors are used depending for example on the type of formation to be reinforced.

A common type of rock bolt is the hydraulically expandable rock bolt provided with an expandable body to be driven into a formation and thereafter expanded by introduction of a pressurized pressure medium such that the expandable body presses against the wall of the borehole and thereby engages the formation. A hydraulically expandable rock bolt is known from CZ 25706 U1.

Another type of rock bolt is the friction bolt. Such a rock bolt may be driven into a formation by a driving device such as a jumbo. The mechanically expandable bolt comprises an elongate expandable outer body, sometimes referred to as a split-tube, and a central rod extending inside the outer body from a trailing portion provided with a nut to a leading portion operatively connected to an expansion mechanism for expanding the outer body upon rotation of the central rod.

At installation of the mechanically expandable rock bolt in the formation, the driving device is operated to repeatedly impact the outer body of the bolt, thereby forcing the outer body into the formation. When the bolt is sufficiently far driven into the formation the bolt is expanded by rotation of the blind nut, which causes rotation of the central rod such that the expansion mechanism causes expansion of the outer body. The blind nut may be a blind nut such that the blind nut can first be screwed onto a thread at the threaded trailing portion of the central rod, wherein the central rod eventually bottoms out in the blind nut, thereby preventing further relative rotation between the central rod and the blind nut. This allows torque to be applied to the blind nut and further to the central rod for tensioning of the expansion mechanism of the bolt. Other means for preventing co-rotation between the central rod and nut are feasible, such as thread-locking fluid or a shearing pin, wherein a standard nut with through hole may be used instead of a blind nut.

Some friction bolts comprise an outer body but no expansion mechanism, wherein the bolt is forced into the formation with a press-fit to anchor the bolt in the formation.

For many types of rock bolt, it is advantageous to rotate the blind nut after driving the bolt into the formation to thereby increase strength of the attachment of the bolt to the formation.

Non-expandable bolts, such as resin bolts, may also need rotation after insertion by rotation of a nut attached to a trailing portion of the bolt.

AU2010223134B2 discloses a mechanically expandable friction bolt.

Sometimes, an operator installing a rock bolt does not rotate the blind nut after driving the bolt into the formation and instead removes the driving device from the blind nut. Effectively this means that the bolt has not been properly installed.

Manual inspection and tightening of a plurality of bolts in a formation is time-consuming and error-prone and faulty installation of the rock bolts is dangerous since portions of the formation may unintentionally collapse.

U.S. Pat. No. 3,161,174 teaches a tension indication device for an expandable rock bolt but the technical solution is complex.

U.S. Pat. No. 4,000,681 also teaches a tension indication device for an expandable rock bolt, but the technical solution is also complex.

Hence, there is a need for an improved means for promoting correct installation of rock bolts.

SUMMARY

An object of the invention is to promote correct installation of rock bolts. According to a first aspect of the invention, this object is achieved by the inventive rotation indication device as defined in the appended independent claim 1, with alternative embodiments defined in the dependent claims.

The rotation indication device is for use with a rock bolt comprising a central rod with a threaded trailing portion. The rotation indication device comprises a blind nut comprising a threaded central recess for engaging the trailing portion. Also, the rotation indication device comprises a visual indication means provided at a bottom portion of the central recess and configured such that upon movement of the trailing portion of the central rod into the bottom portion of the central recess, the central rod forces at least a portion of the visual indication means to move through a passage in the blind nut between the bottom portion of the central recess and the outside of the blind nut.

The rotation indication device may comprise a locking means configured to prevent relative rotation between the central rod and the blind nut up to a predetermined torque limit. The locking means is configured to break or release upon exertion of a torque exceeding the predetermined torque limit.

Upon installation of the rock bolt, the bolt is first driven into the rock where after the blind nut is rotated to cause improved anchoring of the rock bolt. When the blind nut is rotated, the central rod may or may not co-rotate with the blind nut. If a locking means is provided, they co-rotate until the predetermined torque is exceeded as the resistance to rotation of the central rod eventually increases. If a locking means is not provided, they typically do not co-rotate and instead the blind nut immediately begins to follow the mutual threads and thereby move along the central rod. Continued rotation of the blind nut with a torque exceeding the torsional strength of any locking means present leads to breaking of the locking provided by the locking means. Continued rotation of the blind nut leads to the blind nut moving further onto the threaded trailing portion of the central rod, such that the available space in the bottom portion of the central recess of the blind nut decreases. The blind nut is permanently blind, in other words even after installation of the bolt the nut remains blind and the bolt does not protrude from the nut. As rotation of the blind nut continues, the threaded end portion of the central rod will eventually force the visual indication means to at least partly come out of the passage in the blind nut which can thus be noticed visually from outside of the blind nut, thereby allowing visual inspection of the rock bolt. If the driver socket is removed from the bolt without any rotation of the blind nut by the driver socket, the visual look of the rotation indication device will remain unchanged, indicating that no rotation has been made wherein measures can be taken to reconnect the driver socket and rotate the blind nut to thereby correctly anchor the bolt in the formation or take any other necessary measures, such as installing another bolt adjacent to the incorrectly installed bolt.

The visual indication means may comprise a liquid or paste-form indication substance. When the blind nut is screwed onto the threaded trailing portion of the central rod, the space between the end of the bolt and the blind nut decreases and eventually the bolt forces the liquid or paste-form indication substance through the passage to the outside of the blind nut where it is visually exposed. The technical solution using a liquid or paste-form indication substance is robust and allows the passage to be oriented in any direction.

Also, a plurality of such passages may be provided, wherein, said plurality of passages extend in different directions about the central axis 10 of the blind nut. The provision of a plurality of passages extending is different directions will cause the indication substance to move through the passages and emanate at separate portions around the central axis of the blind nut such that the indication substance is visible from many directions.

The visual indication means may comprise a solid indication body movably mounted in the passage, wherein an inner portion of the solid indication body extends from the passage into the bottom portion 8 of the central recess, wherein an outer portion of the solid indication body is configured such that it is movable from a hidden position within the passage to a visible position outside of the blind nut upon movement of the inner portion of the solid indication body into the passage at movement of the central rod into the bottom portion of the central recess. Upon screwing the blind nut onto the central rod, the central rod forces the inner portion of the solid indication body into the passage, thereby moving an outer portion of the solid indication body out of the passage enabling visual inspection.

The solid indication body may be attached to the blind nut by press-fit. The press-fit holds the solid indication body such that it cannot unintentionally move through the passage and thereby enables use of the rotation indication device with bolts in any orientation.

The solid indication body may comprise a central body shaped to be movable through the passage, and one or more protrusions extending from a side surface of the central body to mitigate movement from the hidden position to the visible position. The one or more protrusions prevent unintentional movement of the central body through the passage but are configured to deform or break upon movement of the rod into the central recess wherein the central body moves outwards through the passage.

The visual indication means may comprise an indicator removably attached to the blind nut such that it is visible when attached to the blind nut, wherein the visual indication means further comprises an actuation means movably mounted in the passage with an inner portion of the actuation means extending from the passage into the bottom portion of the central recess, wherein the actuation means is configured such that upon being forced outwards through the passage by the threaded trailing portion of the central rod, an outer portion of the actuation means forces the indicator to separate from the blind nut. After separation of the indicator from the blind nut, it is clearly visible at inspection that the indicator is missing such that one can conclude that the blind nut has been rotated and tensioned over the predetermined torque of any locking means present.

The actuation means may alternatively be integrated with the indicator in the form of a protrusion extending from the indicator through the passage and further into the bottom portion of the central recess. At separation of the indicator from the blind nut, the protrusion thus follows the indicator out of the passage and falls off the blind nut.

The indicator may be removably attached to the blind nut by press fit of the indicator in a corresponding recess of the blind nut. The press-fit provides for a reliable connection between the blind nut and the indicator whilst being easy to manufacture and assemble.

The actuation means may be separate from the indicator. In this embodiment, the actuation means is not integrated with the indicator but provided as a separate part. The actuation means extends through the passage into the central recess and acts to force the indicator to separate from the blind nut upon tensioning of the blind nut over the predetermined torque, wherein the indicator is free to fall off even if the actuation means would stay with the blind nut. This ensures the indicator falls off no matter what orientation the bock bolt is installed in, such as horizontally.

The indicator may be removably attached to the blind nut by a plurality of attachment hooks provided on the blind nut, wherein the material of the indicator or of the attachment hooks is resilient enough to allow the indicator to be forced past the attachment hooks by the actuation means such that the indicator separates from the blind nut.

The indicator may be removably attached to the blind nut by a plurality of attachment hooks provided on the blind nut, wherein the material of the indicator is chosen such that the indicator breaks into pieces and separates from the blind nut upon being forced outwards by the actuation means.

The locking means may comprise a thread locking compound, or it may alternatively comprise a shear pin.

The indicator may be provided with an electronic ID-tag or a graphical ID-mark.

Another aspect of the disclosure relates to a rock bolt assembly comprising a rotation indication device as described above, and the rock bolt.

BRIEF DESCRIPTION OF DRAWINGS

All embodiments of the rotation indication device are for use with a rock bolt, but the bolt is only partly illustrated in FIGS. 1*a-b*, 2*a-b* and 3*a-b*. The rock bolt is not shown in FIGS. 4*a-b* and 5*a-b*.

For the various embodiments shown in the figures, figures a relate to the rotation indication device before tensioning and figures b relate to the rotation indication device after tensioning over the predetermined torque.

FIGS. 1*a-b* relate to a rotation indication device using a liquid or paste-form indication substance which is expelled to the outside of the blind nut upon proper tensioning of the blind nut. The blind nut has only one passage for the liquid/fluid to be expelled through.

FIGS. 2*a-b* relate to a rotation indication device based on the same principle as the one of FIGS. 1*a-b*, however with multiple passages for expelling of liquid/paste through.

An alternative approach is used by the rotation indication device according to the embodiment shown in FIGS. 3a-b. This rotation indication device has a solid indication body instead of a liquid or paste-form indication substance.

FIGS. 3a-b, solid indication body movable between hidden position and visible position FIGS. 4a-b, External sign/indicator which falls off. Indicator separate from actuation means.

Figure 5A:
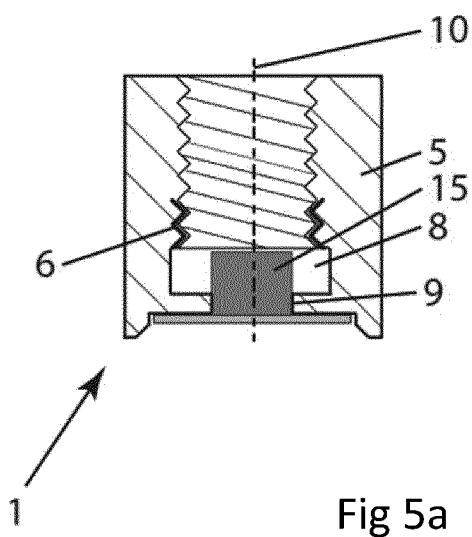
Figure 5B:
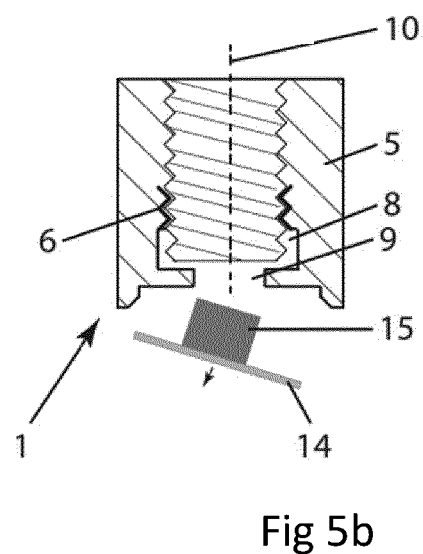

FIGS. 5a-b, External sign/indicator which falls off. Indicator integrated with actuation means.

Figure 6:
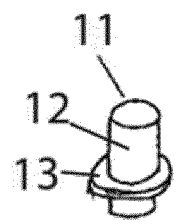

FIG. 6 is an enlarged detail view of the solid indication body also shown in FIGS. 3a-3b.

| | |
|---|---|
| 1 | rotation indication device |
| 2 | rock bolt |
| 3 | central rod |
| 4 | threaded trailing portion |
| 5 | blind nut |
| 6 | locking means |
| 7 | visual indication means |
| 8 | bottom portion of central recess |
| 9 | passage |
| 10 | central axis of blind nut |
| 11 | solid indication body |
| 12 | central body |
| 13 | protrusion |
| 14 | indicator |
| 15 | actuation means |
| 16 | attachment hooks |
| 17 | rock bolt assembly |
| 18 | driver socket |

DETAILED DESCRIPTION

A rotation indication device 1 according to a first embodiment will hereinafter be described with reference to the appended drawings.

The rotation indication device 1 is suitable for use with a rock bolt comprising a central rod 3 with a threaded trailing portion 4. The rock bolt is mounted to the formation as known in the art by drilling the hole in the formation, inserting the rock bolt, and rotating the blind nut of the rock bolt. Often, the rock bolt comprises a wedge-mechanism causing the rock bolt to be anchored in the formation upon tensioning of the wedge mechanism.

A driver socket 18 is used to hammer the rock bolt 2 into the formation, and the driver socket 18 is subsequently rotated to apply a momentum to the blind nut 5 at the end of the rock bolt 2. In the present invention, the blind nut 5 is part of a rotation indication device 1 for enabling easy visual inspection of the installed rock bolt 2 to ensure that the rock bolt 2 has been properly installed.

The rotation indication device 1 comprises a blind nut 5 comprising a threaded central recess for engaging the threaded trailing portion 4. Also, the rotation indication device 1 comprises a locking means 6 configured to prevent relative rotation between the central rod 3 and the blind nut 5 up to a predetermined torque limit, wherein the locking means 6 is configured to break or release upon exertion of a torque exceeding the predetermined torque limit.

The locking means 6 comprises a thread locking compound provided between the threads of the blind nut 5 and the central rod 3, but the locking means may in other embodiments alternatively comprise a shear pin (not illustrated). In further embodiments, the locking means 6 may alternatively comprise a member (not illustrated) positioned between and inner end surface of the central rod 3 and a surface of the blind nut 5 wherein the separate member is configured to move, deform, break or collapse upon exertion of a force above a threshold force such that the blind nut 5 is no longer prevented from being screwed further onto the central rod 3. In some embodiments, the locking means 6 could comprise the solid indication body or the actuation means, wherein the solid indication body or the actuation means are configured to engage the nut to withstand a force from the trailing end portion of the central rod up to a threshold force before further movement of the trailing end portion can proceed, thereby allowing the blind nut to be screwed further onto the central rod. Such engagement may be realized by dimensioning the solid indication body or the actuation means larger than the passage of the blind nut yet small enough to allow the solid indication body or the actuation means to be forced through the passage upon application of a force higher than a threshold force.

The rotation indication device 1 comprises a visual indication means 7 provided at a bottom portion 8 of the central recess and configured such that upon movement of the threaded trailing portion 4 of the central rod 3 into the bottom portion 8 of the central recess, the central rod 3 forces at least a portion of the visual indication means 7 to move through a passage 9 in the blind nut 5 between the bottom portion of the central recess and the outside of the blind nut 5. In this embodiment, the visual indication means 7 comprises a liquid or paste-form indication substance but in other embodiments the visual indication means 7 may alternatively have some other suitable configuration, such as a solid body (see FIGS. 3a-3b).

Upon tightening of the blind nut 5, the central rod 3 first co-rotates with the blind nut 5, for example to tighten an expansion mechanism of the rock bolt 2. Once the torque required to further rotate the blind nut 5 exceeds the predetermined torque, the locking means 6 breaks/releases and the blind nut 5 begins to rotate relatively the central rod 3 with their threads cooperating. This leads the central rod 3 further into the central recess, thereby forcing the liquid or paste-form indication substance out of the passage 9 of the blind nut 5 such that the liquid or paste-form indication substance is visible from outside.

In other embodiments, the locking means 6 may alternatively be omitted. When a locking means 6 is present, the rotation indication device 1 functions to indicate that a minimum torque has been applied to the blind nut 5 and that the blind nut 5 has been further rotated after that. When a locking means 6 is not provided, the rotation indication device 1 indicates that the blind nut 5 has been rotated relatively the central rod 3.

In this embodiment, only one passage is provided, as shown in FIGS. 1a-1b, but in other embodiments, as shown in FIGS. 2a-2b, more passages may be provided through which the liquid or paste-form indication substance may move from the central recess of the blind nut to the exterior of the blind nut 5.

In some embodiments, a solid indication body may be provided instead of the liquid or paste-form indication substance. In the embodiment shown in FIGS. 3a-3b, the solid indication body 11 is movably mounted in the passage 9. An inner portion of the solid indication body 11 extends from the passage 9 into the bottom portion 8 of the central recess, wherein an outer portion of the solid indication body 11 is configured such that it is movable from a hidden position within the passage 9 (see FIG. 3a) to a visible position outside of the blind nut (see FIG. 3b) upon movement of the inner portion of the solid indication body 11 into the passage 9 at movement of the central rod 3 into the bottom portion 8 of the central recess.

In an alternative embodiment (not illustrated in figures), the solid indication body may be configured to be positioned within the central recess but not extending into the passage 9 until it is forces into the passage 9 by the central rod 3 upon tensioning of the blind nut.

The solid indication body 11 may attached to the blind nut 5 by press-fit.

The solid indication body 11 comprises a central body 12 shaped to be movable through the passage 9, and a protrusion 13 in the form of a circumferential flange (see FIG. 6) extending from a side surface of the central body 12. The ridge is larger than the size of the passage 9 and thus does mitigate movement of the solid indication body 11 from the hidden position to the visible position. When a high-enough torque is applied to the blind nut 5, the ridge/protrusion 13 deforms or breaks to allow further outwards movement of the central body 12 (see FIG. 3b), wherein the material of the protrusion/ridge 13 may act to prevent the central body 12 from falling out of the passage 9.

As an alternative to using a solid indication body movable between a hidden and a visible position, an indicator 14 may be provided on the outside of the blind nut 5. The indicator 14 is thus visible before the bolt 2 is driven into the rock, and after the bolt 2 has been driven into the rock. However, the indicator separates from the blind nut 5 and falls off upon correct installation of the bolt 2, wherein one can easily see that the indicator has fallen off, indicating correct installation.

Hence, the visual indication means 7 may comprise an indicator 14 removably attached to the blind nut 5 such that it is visible when attached to the blind nut 5. The visual indication means 7 further comprises an actuation means 15 movably mounted in the passage 9 with an inner portion of the actuation means 15 extending from the passage 9 into the bottom portion of the central recess. The actuation means 15 is configured such that upon being forced outwards through the passage 9 by the threaded trailing portion of the central rod 3, an outer portion of the actuation means 15 forces the indicator 14 to separate from the blind nut 5.

The actuation means 15 may be separate from the indicator 14, as shown in the embodiment of FIGS. 4a-4b. In the embodiment of FIGS. 5a-5b, the actuation means 15 is however integrated with the indicator 14 in the form of a protrusion 13 extending from the indicator 14 through the passage 9 and further into the central recess.

In some embodiments, such as the one of FIGS. 4a-4b, the actuation means 15 is configured to remain in the passage 9 after separation of the indicator 14 with an outer portion of the actuation means 15 visible from the outside of the blind nut 5. Preferably, the indicator is provided with a first color and the outer portion of the actuation means provided with a second color different and easily distinguishable from the first color. For example, the first color could be a red color and the second color a green color, and any one or more of the colors could be fluorescent. Additionally or alternatively, the indicator when attached to the blind nut covers an external portion of the blind nut provided with a color or pattern different from the color or pattern of the indicator such that the difference in visual appearance is clearly distinguishable at inspection after separation of the indicator.

In the embodiment of FIGS. 4a-4b, the indicator 14 is removably attached to the blind nut 5 by a plurality of attachment hooks 16 provided on the blind nut 5, wherein the material of the indicator 14 or of the attachment hooks 16 is resilient enough to allow the indicator 14 to be forced past the attachment hooks 16 by the actuation means 15 such that the indicator 14 separates from the blind nut 5. In an alternative embodiment, the material of the indicator 14 is chosen such that the indicator breaks into pieces and separates from the blind nut 5 upon being forced outwards by the actuation means 15 against the hooks 16.

Instead of using hooks 16, the indicator 14 may instead be removably attached to the blind nut 5 by press fit of the indicator 14 in a corresponding recess of the blind nut 5, as shown in the embodiment of FIGS. 5a-5b. In this embodiment, the indicator is press-fitted into an outer recess of the blind nut 5, but in other embodiments, the indicator 14 may be attached via the actuation means 15 being press fitted in the passage 9. The provision of an outer recess for receiving the indicator 14 protects the indicator 14 from being unintentionally torn off from the rock bolt 2.

The rotation indication device 1 may be provided as a separate device 1 or it may be provided together with the rock bolt 2 as an assembly.

The invention claimed is:

1. A rotation indication device for a rock bolt comprising:
a central rod with a threaded trailing portion;
a blind nut including a threaded central recess arranged for engaging the threaded trailing portion and an inner projection at a bottom thereof; and
a visual indication means provided at a bottom portion of the central recess and configured such that upon movement of the threaded trailing portion of the central rod into the bottom portion of the central recess, the central rod forces at least a portion of the visual indication means to move through at least one passage in the blind nut between the bottom portion of the central recess and the outside of the blind nut, wherein the blind nut is permanently blind, wherein the blind nut is first screwed onto a thread at the threaded trailing portion of the central rod, and wherein the central rod is arranged to abut the projection at the bottom of the blind nut, thereby preventing further movement of the central rod within the blind nut.

2. The rotation indication device according to claim 1, further comprising a locking means configured to prevent relative rotation between the central rod and the blind nut up to a predetermined torque limit, wherein the locking means is configured to break or release upon exertion of a torque exceeding the predetermined torque limit.

3. The rotation indication device according to claim 2, wherein the locking means comprises a member positioned between and inner end surface of the central rod and a surface of the blind nut wherein the member is configured to move, deform, break or collapse upon exertion of a force above a threshold force such that the blind nut is no longer prevented by the locking means from being screwed further onto the central rod.

4. The rotation indication device according to claim 2, wherein the locking means comprises a solid indication body or an actuation means, wherein the solid indication body or the actuation means is configured to engage the nut to withstand a force from the trailing end portion of the central rod up to a threshold force.

5. The rotation indication device according to claim 1, wherein the visual indication means includes a liquid or paste-form indication substance.

6. The rotation indication device according to claim 5, wherein the at least one passage comprises a plurality of passages, said plurality of passages extending in different directions about the central axis of the blind nut.

7. The rotation indication device according to claim 1, wherein the visual indication means includes a solid indication body movably mounted in the at least one passage, wherein an inner portion of the solid indication body extends from the at least one passage into the bottom portion of the central recess, wherein an outer portion of the indication body is configured such that it is movable from a hidden position within the at least one passage to a visible position outside of the blind nut upon movement of the inner portion of the indication body into the at least one passage at movement of the central rod into the bottom portion of the central recess.

8. The rotation indication device according to claim 7, wherein the solid indication body is attached to the blind nut by a press-fit.

9. The rotation indication device according to claim 7, wherein the solid indication body comprises a central body shaped to be movable through the passage, and one or more protrusions extending from a side surface of the central body to mitigate movement from the hidden position to the visible position.

10. The rotation indication device according to claim 1, wherein the visual indication means includes an indicator removably attached to the blind nut such that it is visible when attached to the blind nut, wherein the visual indication means further includes an actuation means movably mounted in the at least one passage with an inner portion of the actuation means extending from the at least one passage into the bottom portion of the central recess, wherein the actuation means is configured such that upon being forced outwards through the at least one passage by the threaded trailing portion of the central rod, an outer portion of the actuation means forces the indicator to separate from the blind nut.

11. The rotation indication device according to claim 10, wherein the actuation means is integrated with the indicator in the form of a protrusion extending from the indicator through the at least one passage and further into the central recess.

12. The rotation indication device according to claim 11, wherein the indicator is removably attached to the blind nut by a press fit of the indicator in a corresponding recess of the blind nut.

13. The rotation indication device according to claim 10, wherein the actuation means is separate from the indicator.

14. The rotation indication device according to claim 13, wherein the actuation means is configured to engage with the blind nut so at to remain in the passage after separation of the indicator with an outer portion of the actuation means visible from the outside of the blind nut.

15. The rotation indication device according to claim 10, wherein the indicator is removably attached to the blind nut by a plurality of attachment hooks provided on the blind nut, wherein the material of the indicator or of the attachment hooks is resilient enough to allow the indicator to be forced past the attachment hooks by the actuation means such that the indicator separates from the blind nut.

16. The rotation indication device according to claim 10, wherein the indicator is removably attached to the blind nut by a plurality of attachment hooks provided on the blind nut, wherein the material of the indicator is chosen such that the indicator breaks into pieces and separates from the blind nut upon being forced outwards by the actuation means.

17. The rotation indication device according to claim 10, wherein the indicator is provided with an electronic ID-tag or a graphical ID-mark.

18. The rotation indication device according to claim 10, wherein the locking means comprises a thread locking compound.

19. The rotation indication device according to claim 10, wherein the locking means comprises a shear pin.

20. A rock bolt assembly comprising a rotation indication device according to claim 1 and a rock bolt.

* * * * *